(12) United States Patent
Couarraze

(10) Patent No.: US 11,435,243 B2
(45) Date of Patent: Sep. 6, 2022

(54) PRINTED CIRCUIT BOARD HAVING STRAIN GAUGES POSITIONED NEAR CORNERS THEREOF

(71) Applicants: Continental Automotive France, Toulouse (FR); Continental Automotive GmbH, Hannover (DE)

(72) Inventor: Stéphane Couarraze, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/288,645

(22) PCT Filed: Nov. 14, 2019

(86) PCT No.: PCT/EP2019/081354
§ 371 (c)(1),
(2) Date: Apr. 26, 2021

(87) PCT Pub. No.: WO2020/099576
PCT Pub. Date: May 22, 2020

(65) Prior Publication Data
US 2021/0396606 A1  Dec. 23, 2021

(30) Foreign Application Priority Data
Nov. 16, 2018  (FR) ...................................... 1860574

(51) Int. Cl.
*G01L 1/22* (2006.01)

(52) U.S. Cl.
CPC .......... *G01L 1/2206* (2013.01); *G01L 1/2281* (2013.01)

(58) Field of Classification Search
None
See application file for complete search history.

(56) References Cited

U.S. PATENT DOCUMENTS

| | | | | |
|---|---|---|---|---|
| 2005/0120807 A1* | 6/2005 | Wingett | ................ | G01L 5/0047 73/862.041 |
| 2007/0205791 A1* | 9/2007 | Ahmad | .............. | G01R 31/2817 73/862.474 |
| 2009/0015278 A1* | 1/2009 | Dang | ................... | H05K 1/0271 324/762.06 |
| 2010/0236334 A1* | 9/2010 | Koschmieder | ......... | G01N 19/08 73/799 |

(Continued)

OTHER PUBLICATIONS

International Search Report and Written Opinion for International Application No. PCT/EP2019/081354, dated Mar. 4, 2020, with partial English translation, 10 pages.

(Continued)

*Primary Examiner* — Lisa M Caputo
*Assistant Examiner* — Nigel H Plumb
(74) *Attorney, Agent, or Firm* — RatnerPrestia

(57) ABSTRACT

A printed circuit board including electronic components, a carrier equipped with a network of conductor tracks electrically connecting the electronic components, and a plurality of strain gauges positioned on the carrier such that each one of the plurality of corners has a respective one of the plurality of strain gauges positioned closer to the one of the plurality of corners than to any other of the plurality of corners.

15 Claims, 2 Drawing Sheets

(56) References Cited

U.S. PATENT DOCUMENTS

| | | | | |
|---|---|---|---|---|
| 2011/0075387 A1* | 3/2011 | Homer | ............... | G01L 5/0047 |
| | | | | 73/777 |
| 2015/0262708 A1* | 9/2015 | Lee | ..................... | G01K 7/02 |
| | | | | 365/191 |
| 2017/0350936 A1* | 12/2017 | McMeen | ............. | G01D 21/00 |

OTHER PUBLICATIONS

International Search Report and Written Opinion for International Application No. PCT/EP2019/081354, dated Mar. 4, 2020, 14 pages (French).

* cited by examiner

PRINTED CIRCUIT BOARD HAVING STRAIN GAUGES POSITIONED NEAR CORNERS THEREOF

CROSS REFERENCE TO RELATED APPLICATIONS

This application is the U.S. National Phase Application of PCT International Application No. PCT/EP2019/081354, filed Nov. 14, 2019, which claims priority to French Patent Application No. 1860574, filed Nov. 16, 2018, the contents of such applications being incorporated by reference herein.

FIELD OF THE INVENTION

The invention relates to the field of electronics, and is aimed at protecting printed circuit boards and making them more reliable.

BACKGROUND OF THE INVENTION

Printed circuit boards, also called PCBs, are used widely in the field of electronics. They are plates that mechanically carry electronic components and electrically connect them to one another, whether they are surface-mounted or mounted in through-holes. Printed circuit boards regularly increase in terms of complexity and in terms of number of layers, thereby generating constraints for the mechanical holding of the components, and are generally subject to high constraints in terms of manufacturing costs. The mechanical architecture created by a printed circuit board generally results from a compromise between the mechanical strength requirements of the components and the electrical connection requirements of these components. However, a large part of the reliability of the printed circuit board is determined by its mechanical holding ability, in particular under the influence of the heat possibly released by the components.

When a printed circuit board is designed, digital simulation means are generally used to predict the thermal behavior of the printed circuit board and thus to optimize its reliability with regard to phenomena caused by temperature, and in particular expansion. However, digital simulations are inaccurate in the field of predicting the mechanical and thermal behavior of a printed circuit board. Moreover, actual tests on prototypes are not compatible with the currently applicable requirements in terms of design time and manufacturing cost.

SUMMARY OF THE INVENTION

An aspect of the invention makes it possible to improve printed circuit boards from the prior art by proposing a printed circuit board having increased reliability, without increasing the manufacturing cost thereof.

To this end, an aspect of the invention targets a printed circuit board comprising electronic components and a carrier equipped with a network of conductor tracks electrically connecting the electronic components, characterized in that it comprises a strain gauge.

Such a printed circuit board thus incorporates means for measuring its mechanical deformations, thereby making it possible to monitor the mechanical evolution of its physical carrier function.

The mechanical deformations observed in the printed circuit board may be saved such that the manufacturer of a given printed circuit board model may have an important source of data regarding the reliability of this circuit in order to improve the design of subsequent versions of its printed circuit board model or its designs for future printed circuit boards. The events that have taken place over the life of a given printed circuit board may moreover be known and consulted for issues with regard to warranty, detection of incorrect mounting or abnormal thermal stresses, and also diagnostic assistance in the event of a fault. The reliability and repairability of a printed circuit board are thus improved, these criteria being essential in modern eco-design approaches.

Furthermore, ad-hoc measurements may be taken in order to reduce the activity of the component or components generating enough heat to induce thermal expansion that is detrimental to the operation or to the longevity of the printed circuit board.

The printed circuit board may comprise the following additional features, on their own or in combination:
the strain gauge is fastened to the carrier;
the strain gauge is adhesively bonded to the carrier;
the strain gauge is a component soldered to the surface of the carrier;
the strain gauge is a conductor track forming part of the network of conductor tracks of the carrier;
the printed circuit board comprises a microcontroller designed to receive the deformation information provided by the strain gauge;
the printed circuit board comprises a memory designed to record the information from the strain gauge;
the printed circuit board comprises a temperature sensor the measurements from which are designed to be correlated with the measurements from the strain gauge;
the printed circuit board comprises two strain gauges arranged perpendicular to one another;
the printed circuit board comprises a strain gauge near each of the corners of the carrier;
the printed circuit board comprises a strain gauge near a power component or a group of power components.

Another subject of the invention targets a method for maintaining a printed circuit board as presented above, which comprises a step of storing the deformation information from the strain gauge.

The method may have the following additional features, on their own or in combination:
it comprises a step of limiting the activity of at least one of the electronic components when the deformation measured by the strain gauge exceeds a predetermined threshold;
it comprises a step of reading the history of the information about the deformations experienced by the carrier over time.

BRIEF DESCRIPTION OF THE DRAWINGS

One preferred exemplary embodiment of the invention will now be described with reference to the accompanying drawings, in which.

In these figures, the same references are used to denote the same elements.

DETAILED DESCRIPTION OF THE PREFERRED EMBODIMENTS

Figure 1:
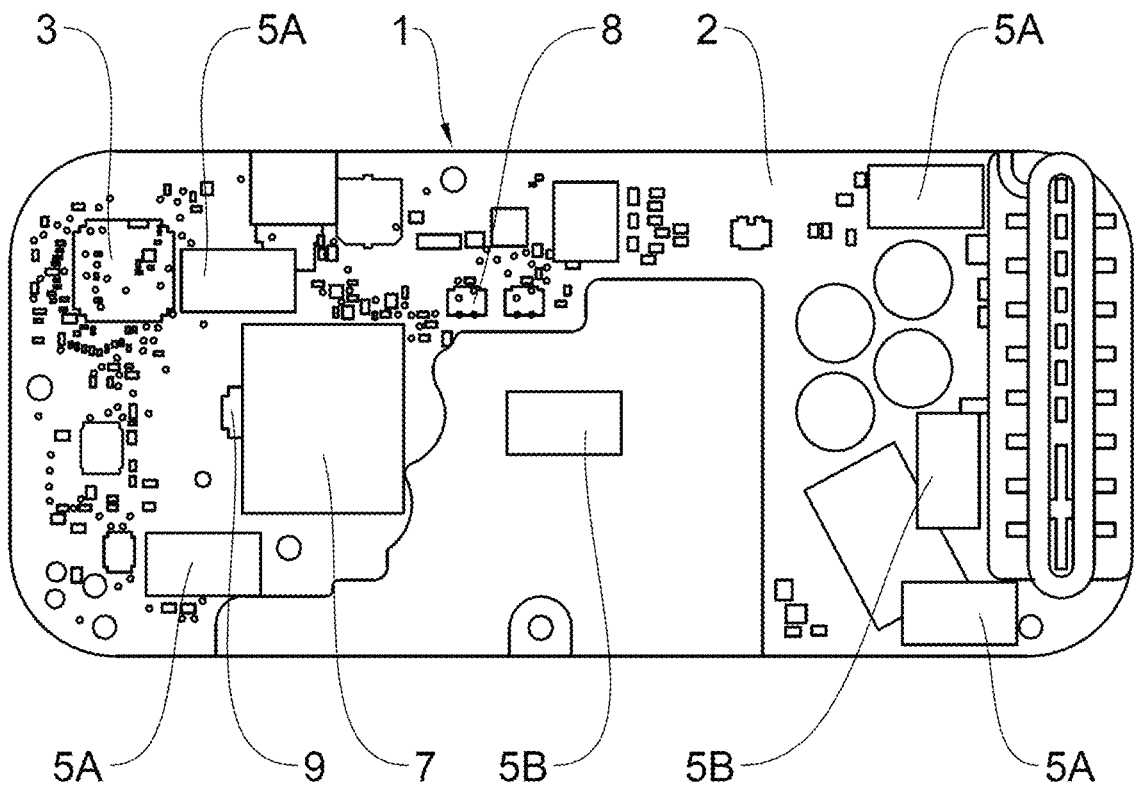
FIG. 1 shows a printed circuit board according to a first embodiment of the invention.

FIG. 1 illustrates one example of a printed circuit board 1 comprising a carrier plate 2 mounted on which are electronic components 3, connectors, and any type of element usually encountered on conventional printed circuit boards.

The carrier plate 2 may be single-layer or multilayer and, on at least one of the layers, the printed circuit board 1 comprises conductor tracks 4 for forming the electrical connections between the components 3.

In this example, the printed circuit board 1 comprises in particular power components and a microcontroller that release heat.

The printed circuit board 1 additionally comprises one or more strain gauges 5A, 5B. FIG. 1 illustrates two positioning examples for the strain gauges 5A, 5B. A first positioning example relates to a set of five strain gauges 5A that are respectively positioned near each corner of the printed circuit board 1 and near the center thereof.

A second positioning example relates to a set of two strain gauges 5B that are designed, together, to measure the deformations in the two directions of the plane of the carrier 2.

Figure 2:
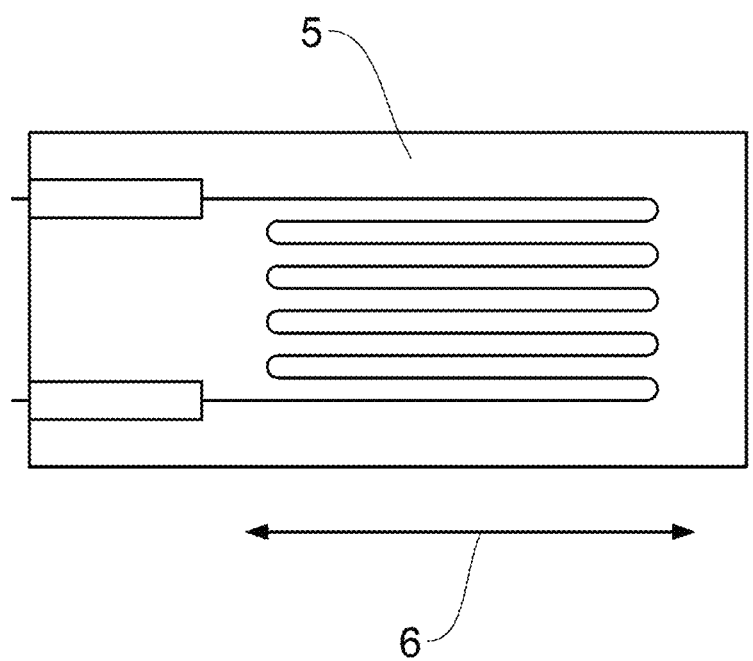
FIG. 2 shows a strain gauge of the printed circuit board from FIG. 1.

FIG. 2 gives one example of a strain gauge 5 able to be used in the printed circuit board 1 from FIG. 1, whether for the first or the second positioning example for the gauges 5A, 5B. The strain gauge 5 comprises a conductor track whose resistance is known. The gauge 5 is adhesively bonded to the carrier 2 so that it accompanies the latter in terms of its deformations. When the printed circuit board 1, and more precisely its carrier 2, deforms in the direction of the arrows 6, the gauge 5 stretches in this direction, thereby having the effect of increasing the length of the conductor track, whose resistance is therefore increased. The measurement of the resistance at the terminals of the gauge 5 therefore makes it possible to ascertain the stretched state of the gauge 5, and is therefore representative of the linear deformation in the direction 6. It is possible to place on the printed circuit board 1 various gauges 5 that are oriented in as many directions for which it is desired to measure the deformation, that is to say as many directions for which it is desired to ascertain the stretching or the compression of the printed circuit board 1.

The first positioning example for the gauges 5A in FIG. 1 aims to divide the printed circuit board 1 into grids. This arrangement is particularly advantageous for measuring deformations linked for example to incorrect mounting of the printed circuit board 1 in its housing, twisting of the carrier 2, or any other significant mechanical deformation.

The second positioning example for the gauges 5B in FIG. 1 is an arrangement with only two strain gauges 5B oriented at right angles, so as to measure the overall linear deformation of the printed circuit board 1 in the two directions of the plane. Such an arrangement is simple and makes it possible to monitor the deformations of the printed circuit at a lower cost.

Whatever the arrangement, the strain gauges 5A, 5B provide information about the deformations experienced by the printed circuit board 1 over its life. To this end, in the present example, the printed circuit board 1 comprises, among its components 3, a microcontroller 7 for the purposes of the function for which the printed circuit board 1 is designed. The microcontroller 7, in addition to performing this primary function, also takes on a secondary function, which is that of monitoring the deformation of the printed circuit board 1. The microcontroller 7, at predefined intervals, measures the resistance at the terminals of the strain gauges 5A, 5B and thus determines the state and the evolution of the deformations experienced by the printed circuit board 1. The monitored deformations will in particular be those linked to the expansion of the printed circuit board 1 under the effect of the heat released by power components or computing components, or under the effect of a thermal shock. The profile of the evolution of the deformations provides information about the type of stress experienced by the printed circuit board (slow heating or thermal shock, for example).

The microcontroller 7 may moreover be programmed to intervene in the operation of the printed circuit board 1 on the basis of the deformation information recorded by the gauges 5A, 5B. For example, if the gauges 5A, 5B detect a deformation beyond a limit threshold, the microcontroller may slow down its computing activity, or omit tasks, in order to lower the released temperature and return the printed circuit board to an acceptable deformation threshold. Likewise, the microcontroller 7 may, as far as possible, slow down or omit the switching of power components such as power transistors that are present on the printed circuit 1. An increased service life is thus achieved by monitoring that guarantees that the printed circuit board 1 is kept out of critical operating regions with regard to the operating temperature, the latter having for example a detrimental effect on the strength of the solder joints of the printed circuit board 1.

The deformation information from the gauges 5A, 5B may moreover be stored in order to monitor the printed circuit board over the long term. The information relating to the deformations of the printed circuit board 1 that take place over time is thus stored in a memory 9. Thus, during inspection or maintenance operations, the history of the deformations of the printed circuit board 1, stored in the memory 9, may be read and correlated with these inspection or maintenance operations. For example, a recurring failure on a particular printed circuit board model may thus be correlated with chronic excess deformation of the printed circuit board, this reflecting for example an insufficiency in the means for cooling the printed circuit board. In this regard, the printed circuit board 1 may furthermore comprise a temperature sensor 8 (see FIG. 1) whose information may be correlated with the deformation behavior of the printed circuit board 1, determined by the strain gauges 5A, 5B.

With regard to the design of the printed circuit boards, the deformation information for all of the printed circuit boards 1 of a manufacturer may be harnessed in order to improve the design of new printed circuit boards. The design times for a printed circuit board are thus reduced, which is essential in the electronics industry.

Figure 3:
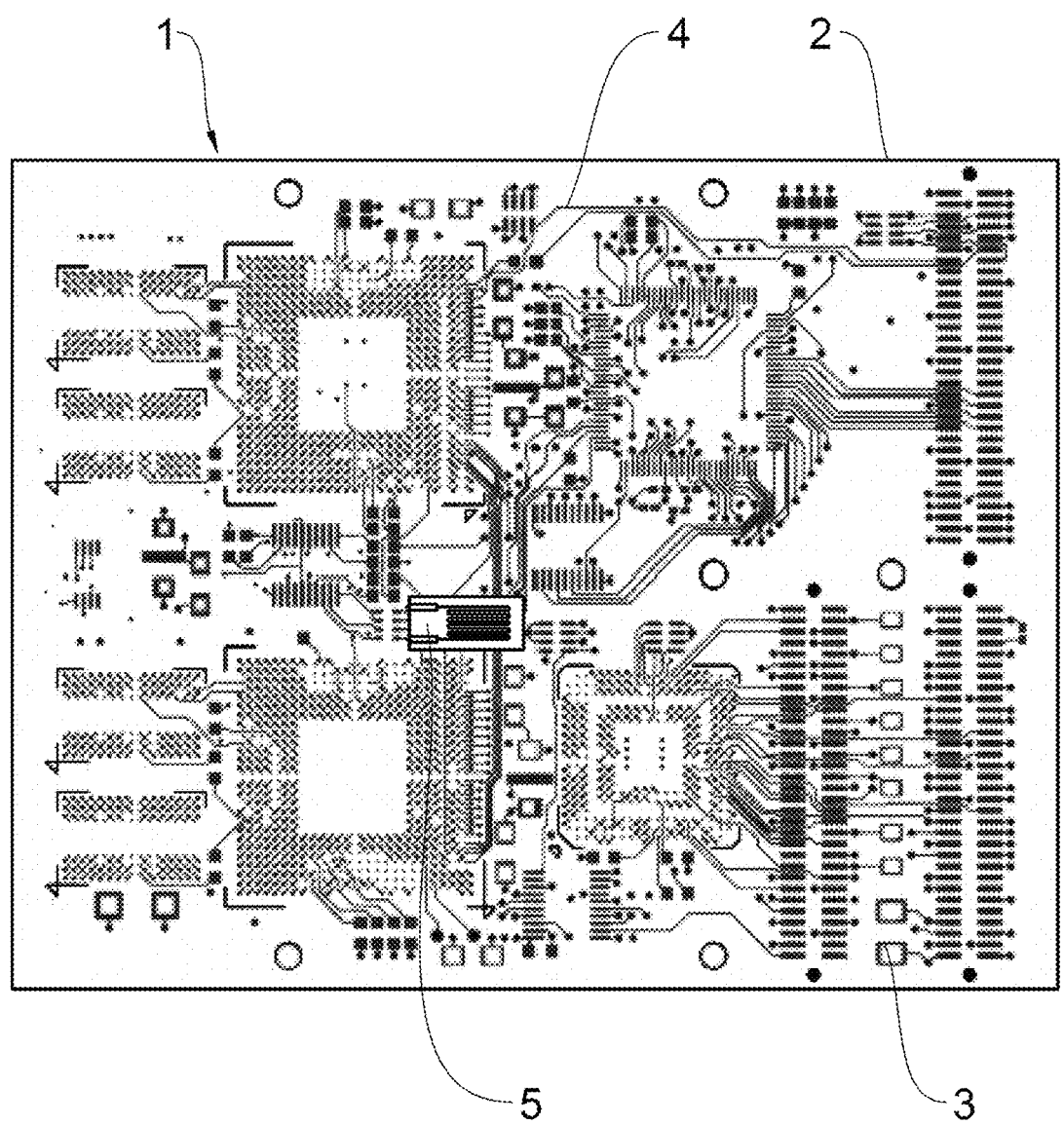
FIG. 3 illustrates one example of installation of a strain gauge on a printed circuit board according to a second embodiment of the invention.

FIG. 3 illustrates another exemplary embodiment of the strain gauges 5. In this example, a strain gauge 5C is produced jointly with the conductor tracks 4 of the printed circuit board. For example, the printed circuit board is produced in a conventional manner by etching copper tracks onto a plate, and the strain gauge 5C is part of these copper tracks. The strain gauge 5C is therefore obtained with almost zero additional cost when manufacturing the printed circuit board. The operation of the strain gauge 5C and the management of the provided deformation information are the same as for the gauges 5A, 5B from FIG. 1.

Moreover, FIG. 3 additionally illustrates a third positioning example for the strain gauges. The strain gauge 5C is placed as close as possible to a given component, for example a power component for which a significant release of heat is expected. According to this third arrangement example, it is chosen to monitor, with one or more gauges 5C, only one or more portions determined as being more critical.

Other variant embodiments of the printed circuit board may be implemented without departing from the scope of an aspect of the invention. For example, the strain gauge or gauges 5 may be formed by a dedicated component that is soldered to the surface of the printed circuit board 1.

The invention claimed is:

1. A printed circuit board comprising:
   electronic components,
   a carrier equipped with a network of conductor tracks electrically connecting the electronic components, the carrier having a plurality of corners, and
   a plurality of strain gauges positioned on the carrier such that each one of the plurality of corners has a respective one of the plurality of strain gauges positioned closer to the one of the plurality of corners than to any other of the plurality of corners.

2. The printed circuit board as claimed in claim 1, wherein the plurality of strain gauges are fastened to the carrier.

3. The printed circuit board as claimed in claim 2, wherein the plurality of strain gauges are adhesively bonded to the carrier.

4. The printed circuit board as claimed in claim 2, wherein the plurality of strain gauges are soldered to the surface of the carrier.

5. The printed circuit board as claimed in claim 2, wherein the each of the plurality of strain gauges comprises a conductor track forming part of the network of conductor tracks of the carrier.

6. The printed circuit board as claimed in claim 1, further comprising a microcontroller designed to receive the deformation information provided by the plurality of strain gauges.

7. The printed circuit board as claimed in claim 1 further comprising a memory designed to record the information from the plurality of strain gauges.

8. The printed circuit board as claimed in claim 1 further comprising a temperature sensor, and in that it is designed to correlate the temperature measurements with the measurements from the plurality of strain gauges.

9. The printed circuit board as claimed in claim 1 wherein two of the plurality of strain gauges are arranged perpendicular to one another.

10. The printed circuit board as claimed in claim 1 further comprising a strain gauge near a power component or a group of power components.

11. A method for maintaining a printed circuit board as claimed in claim 1 comprising storing the deformation information from the plurality of strain gauges.

12. The method as claimed in claim 11, further comprising limiting the activity of at least one of the electronic components (3) when the deformation measured by the plurality of strain gauges exceeds a predetermined threshold.

13. The method as claimed in claim 11, further comprising a step of reading a history of the information about the deformations experienced by the carrier over time.

14. The method as claimed in claim 12, further comprising a step of reading a history of the information about the deformations experienced by the carrier over time.

15. The printed circuit board as claimed in claim 1, wherein the plurality of corners includes four corners and the plurality of strain gauges includes four strain gauges.

* * * * *